Patented Apr. 22, 1924.

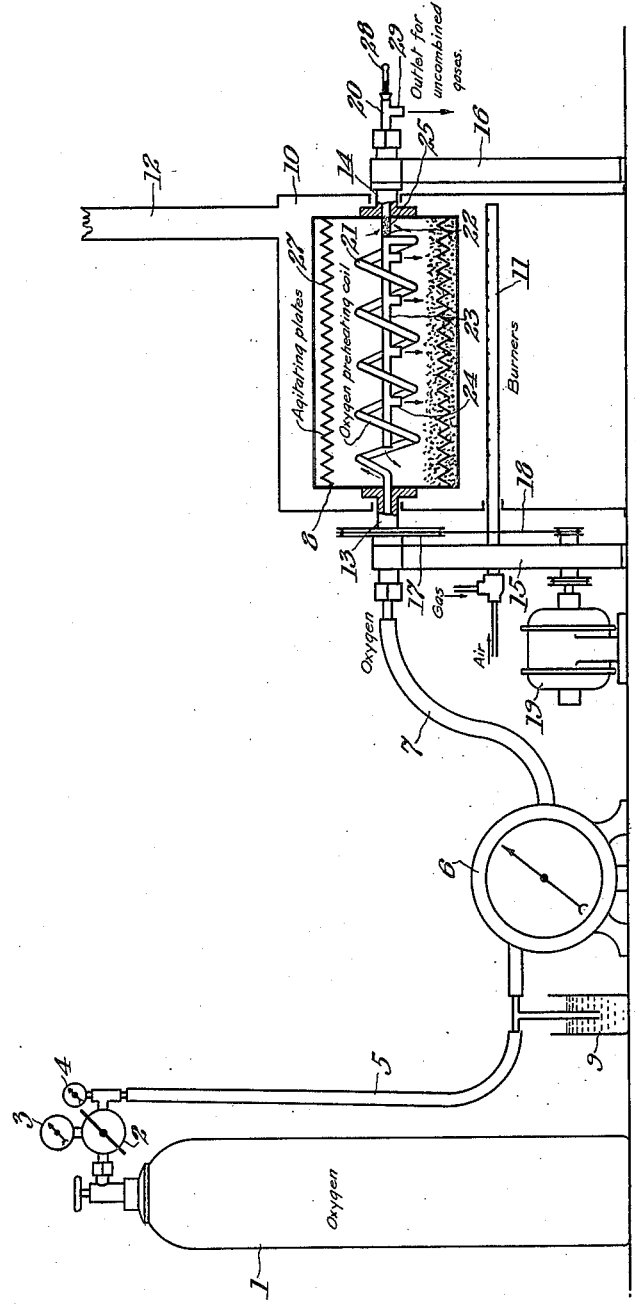

1,491,237

UNITED STATES PATENT OFFICE.

JOHN B. HUFFARD, OF DOUGLASTON, AND PIERRE E. HAYNES, OF BUFFALO, NEW YORK, ASSIGNORS TO UNION CARBIDE & CARBON RESEARCH LABORATORIES, INC., A CORPORATION OF NEW YORK.

PROCESS AND APPARATUS FOR OXIDIZING LEAD.

Application filed May 3, 1922. Serial No. 558,246.

*To all whom it may concern:*

Be it known that we, JOHN B. HUFFARD and PIERRE E. HAYNES, citizens of the United States, residing at Douglaston and Buffalo, in the counties of Queens and Erie and State of New York, have invented certain new and useful Improvements in Processes and Apparatus for Oxidizing Lead, of which the following is a specification.

This invention relates to a process and apparatus for the production of oxids of lead by reacting upon fused metallic lead with a gas containing oxygen. More particularly, the invention in its preferred form comprises a single stage process for the manufacture of minium ($Pb_3O_4$), or mixtures of this oxid with lower oxids of lead, such as massicot (PbO), using a gas containing a proportion of oxygen materially greater than that in atmospheric air. The term "minium" is used herein to designate a definite chemical compound of the composition $Pb_3O_4$, while the term "red lead" is reserved for commercial products having oxygen contents intermediate those of PbO and $Pb_3O_4$, and probably comprising mixtures of minium, with relatively small amounts of lower oxids. A revolving furnace is used to secure the continuous attrition of the charge and exposure of fresh surfaces to oxidation.

Red lead has heretofore been manufactured by air oxidation in two stages. In the first, metallic lead is placed in a reverberatory furnace and heated with free access of air to about 340° C., or slightly above the melting point of lead. In this stage massicot is formed. The temperature must be prevented from rising above a red heat, as at such temperature massicot is converted into the allotropic form, litharge, which is incapable of further oxygen absorption under the conditions of manufacture. The second stage of the process comprises the discharge of the massicot from the furnace, milling and screening, and charging the comminuted product into a furnace, generally of the muffle type, in which it is subjected to a heat somewhat below a dull red, in the presence of air. The massicot is to a greater or less degree oxidized to minium, and is removed and ground for use.

We have discovered that by the novel procedure described hereinafter, red lead may be produced in a single stage with important saving in time and cost of manufacture. The process may also be regulated to yield a mixture of lead oxids especially adapted for particular purposes, for example, a composition comprising minium and a lower oxid and having superior qualities for storage battery plates. Various other objects and advantages of the invention will be apparent from the appended description, reference being had to the accompanying drawing, in which the figure is a diagrammatic, partly sectional illustration of an apparatus for carrying out the process.

Numeral 1 denotes a source of gas rich in oxygen. We prefer to use commercial compressed oxygen, containing about 98% or more, $O_2$ and have illustrated an oxygen cylinder of usual type. However, we are not limited to this as the oxidizing gas, as smaller proportions of oxygen, if materially in excess of that in atmospheric air, may be used with advantage.

A valve 2, pressure gage 3, and pressure regulator 4, of suitable type, are provided on the container 1. A pipe 5 conducts the gas mixture to a meter 6, through which it passes into pipe 7 leading into a rotary tube furnace 8. A safety seal 9 is interposed in the line between the container and meter.

The tube 8 is enclosed in a furnace chamber 10 heated by burners 11 and having a stack 12 for escape of combustion gases. Hollow shafts 13 and 14 are fixed upon the ends of tube 8 and are journalled in standards 15 and 16. A pulley 17 is rigidly secured to shaft 13, and is rotated by belt 18 which is driven by motor 19.

Hollow shafts 13 and 14 receive pipes 7 and 20, respectively. The former pipe is bent into a helical coil 21 which extends substantially the entire length of the furnace tube. Pipe 20 is welded or otherwise secured to pipe 7 at 22, which denotes a right angle bend in pipe 7. From bend 22, the pipe extends in a straight length 23, in alinement with pipe 20, and is provided with nozzles 24. This arrangement of pipes 7, 21, and 23, causes the oxygen to traverse a circuitous path in which its temperatures is raised to a suitable degree before it is discharged into the furnace. Perforations 25 in that part of pipe 20 which lies within the furnace tube permit the exit of gases which have escaped combination in the furnace.

The tube is provided with baffles 27 to assist in the agitation of the charge. A thermometer 28 is inserted in the end of pipe 21, in contact with the effluent gases.

The preferred procedure for oxidizing lead is as follows: The furnace tube 8 is charged with pig lead through a charging door (not shown) and the temperature of the interior of the tube is raised to at least 340° C., to melt the lead. The gas rich in oxygen is then admitted and the tube rotated. The rate of flow of gas is preferably so adjusted that the oxygen is substantially completely fixed by reaction with the lead. However, the gas may be passed at a more rapid rate, and may be recirculated or not, as desired. The oxygen absorption is very rapid at first, but a lower, substantially constant absorption rate is soon established, which is maintained until the greater portion of the lead has been oxidized. The operating conditions largely determine the permissible rate, but in any case a simple test of the effluent gas will indicate whether oxygen is being fed in at a higher rate than that at which it can be absorbed. The pressure may be controlled by the regulator 4, but it is advisable to insert the safety seal 9 to permit the escape of gas should it be supplied under excess pressure.

The oxidation of the molten lead proceeds continuously from metal through massicot to minium. There is a stage of the operation, however, in which most of the lead is converted into massicot and very little minium has been formed. If massicot is the desired product, the process is arrested at this point. Further reaction results in the production of continuously increasing amounts of minium, and any desired mixture of the two oxids may be obtained by shutting down the furnace at the proper time. The conditions of operation will necessarily vary somewhat and it is therefore impracticable to specify the exact duration of the treatment required to produce a given degree of oxidation under all circumstances. Samples may be readily drawn and the composition determined by analysis or estimated by the color.

The following specific example is illustrative of the improved process as applied to the manufacture of a mixture of minium and lower oxid in predetermined proportions. Commercial compressed oxygen is passed, at a rate insuring adequate oxygen absorption, over a charge of molten lead in a rotating furnace. The temperature is maintained around 350° C. and the process is continued for about 24 hours. The oxidation of the lead at the end of the treating period is substantially complete, and the composition of the product corresponds approximately to 50% minium and 50% lead monoxid. This is a desirable mixture for making up storage battery positive plates and we prefer to arrest the process at this stage. The product will be ground and sifted to secure the requisite degree of subdivision and apparent density.

Greater proportions of minium may be obtained by proper adjustment of the temperature and time of reaction. For example, when the temperature is maintained around 430° C. and oxygen passed into the furnace for about 8 hours, approximately 80% of the lead is converted into minium, the remainder being lower oxid. Substantially complete conversion to minium may be obtained by further oxidation. The temperature should not in general greatly exceed 580° C. at any stage of the process.

The oxygen may be preheated before reaching the furnace tube. This procedure is advantageous as regards the oxidation of lead, but frequently results in damage to the tube if made of steel or other relatively easily oxidized metal. Preheating by passing through the helical pipe 21 within the furnace is generally satisfactory.

Any desired oxygen pressure within the furnace tube may be established. In general, however, a pressure sufficient only to carry a slow stream of gas through the apparatus is adequate.

In the preferred form of the invention, as noted, a single stage operation is used. However, the other novel and advantageous features of the invention may be employed with good effect in a plural stage process. For example, it is sometimes desirable to remove the oxidized product from the furnace at about the time when it contains a maximum of massicot, and to grind and screen to remove residual particles of lead. The grinding also puts the massicot in better physical condition for further oxygen absorption by breaking up lumps and exposing fresh surfaces to oxidation. But the continuous attrition of the particles in the revolving furnace treatment forming a part of the present invention, and the high activity of the concentrated oxygen used, make the separate furnacing stages unnecessary for most purposes.

When commercial compressed oxygen is used to oxidize the lead, it is advantageous to collect the effluent gases, which contain a relatively high percentage of argon, and constitute a valuable by-product. This feature of the process is claimed in application Serial No. 558,247 filed of even date herewith.

The oxidizing gas may contain components adapted to accelerate the reaction. For example, a small proportion of dry steam may be used with good effect.

In prior commercial production of minium, as noted above, air has been the oxidizing agent, and so far as we are aware the advantages to be derived from oxidation with substantially pure oxygen were not realized, nor had any lead oxidation process involving its use been devised. By the aid of concentrated oxygen, especially in connection with the apparatus and under the conditions described herein, the time required for the completion of the process may be diminished in many cases by one-half. Important reduction in manufacturing costs is effected by this time saving, and the substitution of mechanical agitation for hand rabbling, as well as by the elimination of the necessity for handling the product at an intermediate stage of the process. Various modifications of the means and procedure by which we obtain these and other advantageous effects of the invention, fall within the scope of the appended claims.

We claim:—

1. Process of oxidizing lead, comprising agitating molten metallic lead and passing into contact therewith a gas containing oxygen materially in excess of atmospheric proportion.

2. The invention according to claim 1, in which commercial oxygen, containing about 98% $O_2$, is passed into contact with the lead.

3. Process of preparing lead oxids, including minium, comprising charging lead into a rotary furnace, melting and continuously heating the lead, rotating the furnace to agitate the lead, and continuously passing into the furnace a gas containing oxygen until the desired percentage of minium has been formed.

4. The invention according to claim 3, in which the gas contains oxygen materially in excess of atmospheric proportion.

5. The invention according to claim 4, in which the gas is preheated before reaching the charge.

6. A single stage process for the production of minium, comprising charging lead into a furnace and maintaining the lead at a temperature above its melting point, passing a gaseous mixture the major portion of which is molecular oxygen into intimate contact with the lead, and continuing the passage of the gaseous mixture until the desired conversion to minium is obtained.

7. The invention according to claim 6, in which the charge is subjected to continuous agitation.

8. Process of making mixtures of oxids of lead having a predetermined composition, comprising passing a gaseous mixture, the major portion of which is molecular oxygen, into contact with molten lead, whereby the composition of the charge varies progressively from lead through a lower oxid to a higher oxid, and arresting the oxidation at a stage when the lower and higher oxids are present in the desired proportions.

9. Process of producing mixtures of minium and lower oxid of lead suitable for making up the positive plates of storage batteries, comprising passing a gaseous mixture, the major portion of which is oxygen, into intimate contact with molten lead, maintaining the temperature of the lead at about 350° C. and arresting the oxidation when the lead is converted into massicot and minium in substantially equal proportions.

10. Apparatus for oxidizing lead, comprising a rotary furnace, means for heating the same, a source of oxidizing gas, a conduit leading from said source to said furnace and extending through the latter in a circuitous path, and a plurality of nozzles connected to said conduit within the furnace.

In testimony whereof, we affix our signatures.

JOHN B. HUFFARD.
PIERRE E. HAYNES.